US007517452B2

(12) United States Patent  
Chapman et al.

(10) Patent No.: US 7,517,452 B2  
(45) Date of Patent: Apr. 14, 2009

(54) FILTER ASSEMBLY

(75) Inventors: Raymond G. Chapman, Killara (AU); David W. Creasy, Asquith (AU)

(73) Assignee: Speciality Plumbling Supplies Pty Ltd, KIllara, NSW (AU)

( * ) Notice: Subject to any disclaimer, the term of this patent is extended or adjusted under 35 U.S.C. 154(b) by 197 days.

(21) Appl. No.: 10/582,030

(22) PCT Filed: Dec. 1, 2004

(86) PCT No.: PCT/AU2004/001682

§ 371 (c)(1), (2), (4) Date: Mar. 29, 2007

(87) PCT Pub. No.: WO2005/056942

PCT Pub. Date: Jun. 23, 2005

(65) Prior Publication Data

US 2008/0017567 A1    Jan. 24, 2008

(30) Foreign Application Priority Data

Dec. 10, 2003    (AU) .............................. 2003906884

(51) Int. Cl.  
*E03C 1/26* (2006.01)  
*E03C 1/262* (2006.01)  
*B01D 35/02* (2006.01)

(52) U.S. Cl. .................. 210/234; 210/235; 210/163; 210/474; 210/482; 4/286; 4/287; 4/290; 4/292; 4/668

(58) Field of Classification Search ............... 210/234, 210/235, 163, 474, 482; 4/286, 287, 290, 4/292, 668  
See application file for complete search history.

(56) References Cited

U.S. PATENT DOCUMENTS

| 1,137,516 | A | * | 4/1915 | Moon ................. 137/247.15 |
| 1,760,659 | A |   | 5/1930 | Pasman |
| 2,246,390 | A | * | 6/1941 | Smith ..................... 210/429 |
| 2,736,040 | A | * | 2/1956 | Mackey .................... 4/287 |
| 2,736,577 | A | * | 2/1956 | Mackey ................. 285/139.3 |
| 2,869,727 | A |   | 1/1959 | Howe |
| 4,692,948 | A | * | 9/1987 | Martin ..................... 4/286 |

FOREIGN PATENT DOCUMENTS

| EP | 0469361 A1 | 2/1992 |
| GB | 596937 A | 1/1948 |
| GB | 776320 A | 6/1957 |
| WO | WO 2004/079109 A | 9/2004 |

\* cited by examiner

*Primary Examiner*—Thomas M Lithgow  
(74) *Attorney, Agent, or Firm*—Townsend and Townsend and Crew, LLP

(57) ABSTRACT

A floor waste (10) including a filter basket (16) having a magnet (18). The magnet (18) attracts a movable valve member (27) upwardly from a seat (22) to allow liquid to pass through the seat (22). When the basket (15) is removed the movable valve member (27) closes the seat (22). In one embodiment the valve member (27) includes a valve disk 29 that prevents the flow of liquid through the seat (22) when engaged therewith, while in another embodiment the disk (29) has a series of passages (31) that permits the flow of liquid through the seat when the disk (29) is engaged with the seat (22).

8 Claims, 3 Drawing Sheets

FILTER ASSEMBLY

TECHNICAL FIELD

The present invention relates to filter assemblies and more particularly but not exclusively to filter assemblies employed in floor wastes.

BACKGROUND OF THE INVENTION

Floor wastes are incorporated in the areas such as commercial kitchens and where food is prepared, to intercept solids before they can enter downstream ducting, such as ducting that may lead to a grease trap or other apparatus.

Known floor waste assemblies include a hollow body within which there is located a removable filter basket. The basket is removed so that the contents may be emptied therefrom, which basket is then placed back in the hollow body of the floor waste. Downstream of the basket is a further filter which is intended to intercept solids should the basket not be replaced. It is not uncommon for the further filter (secondary strainer) to be interfered with so that it is rendered inoperative and does not intercept the solids it is intended to capture. For example, it is possible for staff such as cleaners, to remove the basket, and empty the contents down the trap. To enable the solids to escape the secondary strainer is interfered with.

Described in International Patent Application PCT/AU2004/000276 (WO 2004/079109) is a drain assembly, having a removable basket, that is operable to stop liquid passing through the drainage assembly. A disadvantage of this device is that the movable valve member is urged upwardly to the closed position by a spring and can easily be displaced by a projection being inserted in the device to apply pressure to the valve member to displace it from the closed position. When displaced from the closed position solids can be moved through the drainage assembly while the filter basket is not in place. A still further disadvantage is that when the valve member is in the closed position, the assembly retains solids and liquid. This can inhibit removal of the solids.

OBJECT OF THE INVENTION

It is the object of the present invention to overcome or substantially ameliorate at least one of the above discussed disadvantages of previously known floor waste.

SUMMARY OF THE INVENTION

There is disclosed herein a filter assembly including:
a hollow body through which a fluid is to pass, the body having an inlet and an outlet downstream from the inlet;
a filter member removably located within the body to filter fluid passing from the inlet to the outlet;
a valve seat downstream of the filter member and providing a passage through which the fluid is to pass;
a movable obstruction member movable relative to the seat between a first position engaging the seat to at least inhibit flow of the fluid through the seat passage to thereby retain solids, and a second position spaced upstream of said seat to provide for the flow of fluid and solids though the seat passage; and wherein said filter member and said obstruction member are magnetically attracted so that when said filter member is located within said body said obstruction member is attracted to said fitter member so that said obstruction member moves to said second position, while when said filter member is not located in said body said obstruction member moves to the first position thereof.

Preferably, said filter member includes a magnet that magnetically attracts said obstruction member.

Preferably, said filter member is a basket including a side wall and bottom wall, with said magnet being attached to said bottom wall.

Preferably, said fluid cannot pass through said bottom wall.

Preferably, fluid cannot pass through said obstruction member.

Preferably, said obstruction member includes at least one passage through which fluid may pass so that when said obstruction member is in said first position fluid can pass through said obstruction member so as to pass through the valve seat passage while retaining solids that cannot pass through said at least one passage.

Preferably, said obstruction member is a valve member that engages said seat.

Preferably, said seat includes a support for said obstruction member, the support slidably supporting said obstruction member for movement between the first and second positions thereof.

BRIEF DESCRIPTION OF THE DRAWINGS

A preferred form of the present invention will now be described by way of example with reference to the accompanying drawings wherein.

DETAILED DESCRIPTION OF THE PREFERRED EMBODIMENTS

Figure 1:
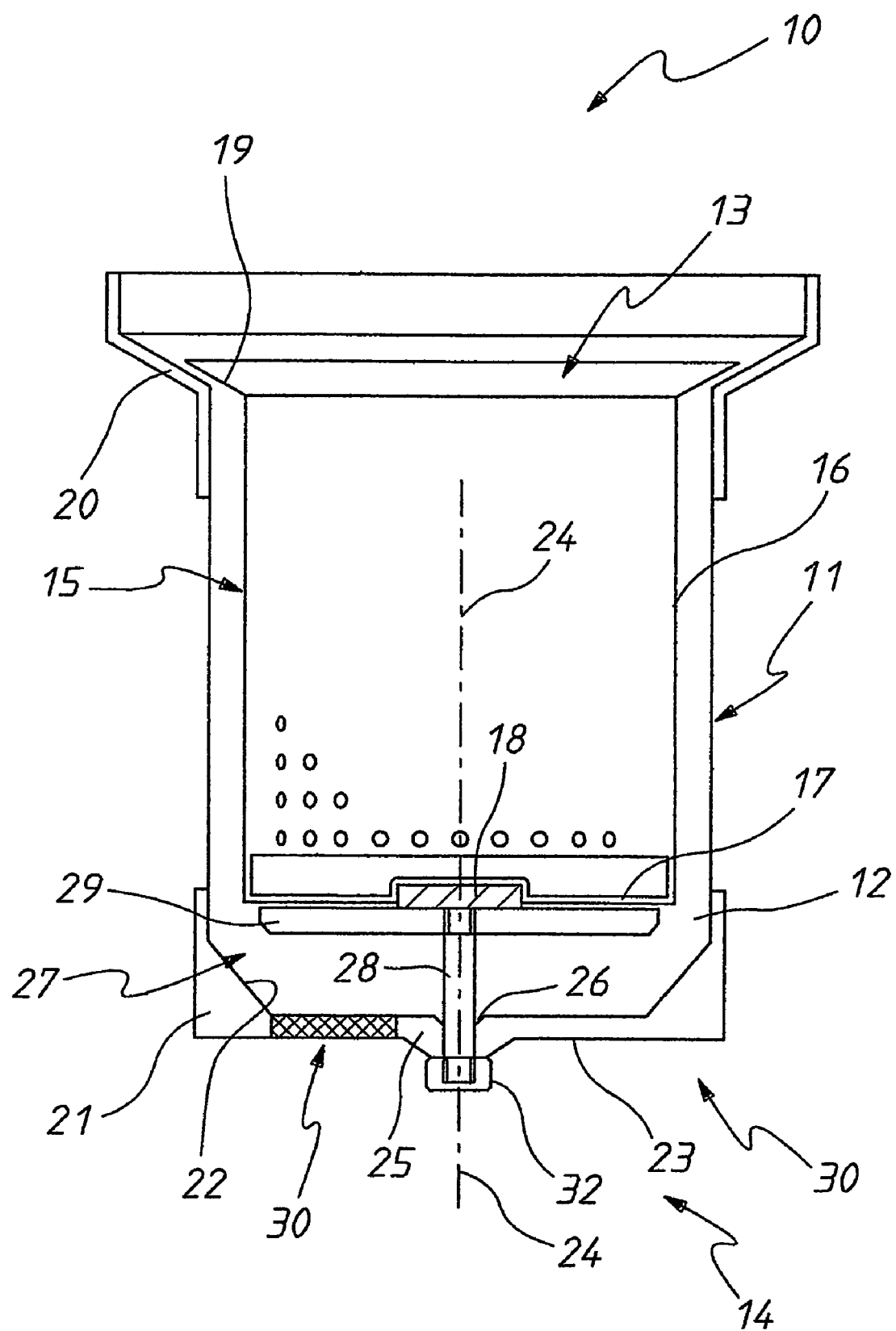
FIG. 1 is a schematic sectioned side elevation of a floor waste.
Figure 2:
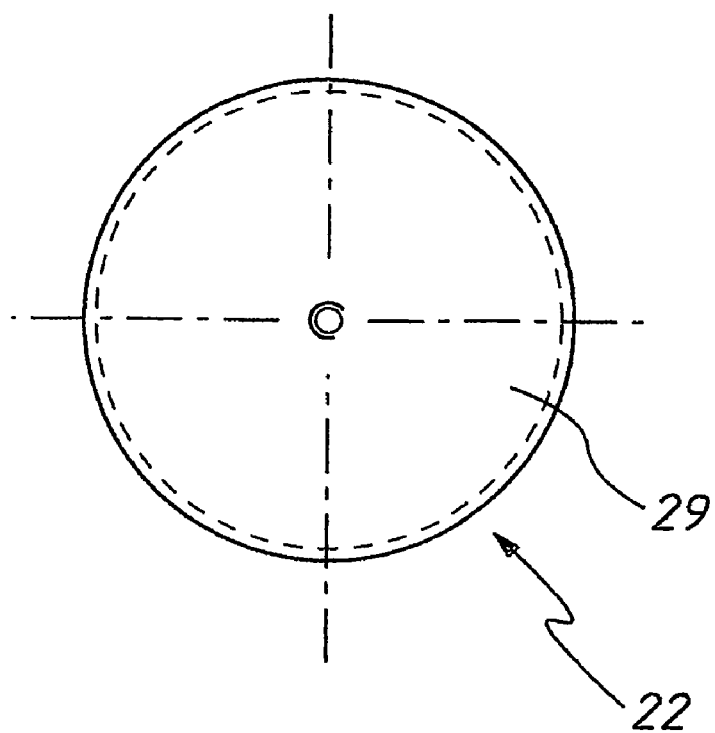
FIG. 2 is a schematic top plan view of a valve member employed in the floor waste of FIG. 1.
Figure 3:
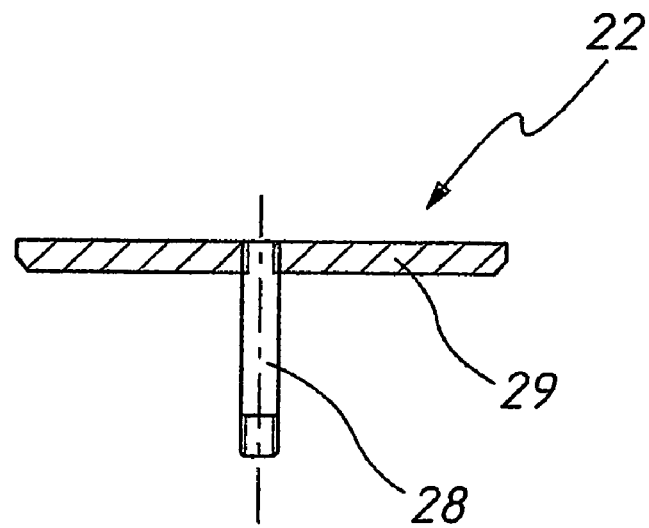
FIG. 3 is a schematic sectioned side elevation of the valve member of FIG. 2.

In the accompanying drawings there is schematically depicted a floor waste 10. However, in this respect it should be appreciated that the present invention is not restricted to a floor waste. It may be employed in other instances where a filter is removed and there is a need to prevent the transfer of solids through the device when the filter has been removed.

The filter assembly 10 includes a hollow body 11 which in this instance is generally cylindrical. The hollow body 11 surrounds a chamber 12 having an upstream (inlet) opening 13 and a downstream (outlet) opening 14. Located within the body 11 is a filter basket 15 having a mesh cylindrical side wall 16 extending upwardly from a floor 17. For example, the floor 17 may be formed of sheet material and would be constructed so that water passing through the assembly 10 could not pass through the floor 17. Mounted in the floor 17 is a magnet 18, preferably a neodymium magnet. The side wall 16 terminates at its upper portions with an inclined sealing flange 19 that engages a seating rim 20 of the body 11.

Downstream of the basket 15 is a valve seat member 21 of annular configuration, providing a valve seat 22 providing a valve passage 30 or passes 30 through which liquid is to pass.

Extending inwardly from the seat 22 are spaced ribs 23 that extend generally radially relative to the longitudinal axis 24 of the body 11. The ribs 23 support an annular flange 25 having central passage 26.

The seat member 21 movably supports an obstruction member in the form of a valve member 27. The valve member 27 includes a stem 28 slidably guided in the passage 26 so that the valve member 27 is movable in the direction of the axis 24 between an open position relative to the seat 22 and a closed position engaging the seat 22 to substantially prevent the movement of liquid, or at least prevent the movement of solids greater than a predetermined size, through the passage/s 30. Attached to the upper end of the stem 28 is a valve disc 29 shaped to engage the seat 22. The disc 29 is attracted to the magnet 18. The lower end of the stem 28 is provided with a nut 32 so that the valve member 27 is captively located with respect to the seat member 21.

In an alternative embodiment the valve disk 29 includes a magnetic portion so as to be attracted to the filter basket 15.

In operation of the above described assembly 10, water enters the basket 15 and is filtered by passing through the side wall 16. Water entering the basket 15 passes through the side wall 16 to enter the chamber 12 from where it exits the assembly 10 via the seat member 21 (passage/s 30). However if the basket 15 is removed, the valve member 27 falls under the influence of gravity so that the valve disc 29 engages the valve seat 22 so as to close the valve passage/s 30. Thereafter water cannot pass through the assembly 10. When the basket 10 is again placed inside the body 11, the magnet 18 attracts the valve disc 29 and causes the valve member 27 to rise. This then again opens the passage/s 30 of the valve seat 22 for fluid to pass therethrough.

Figure 4:
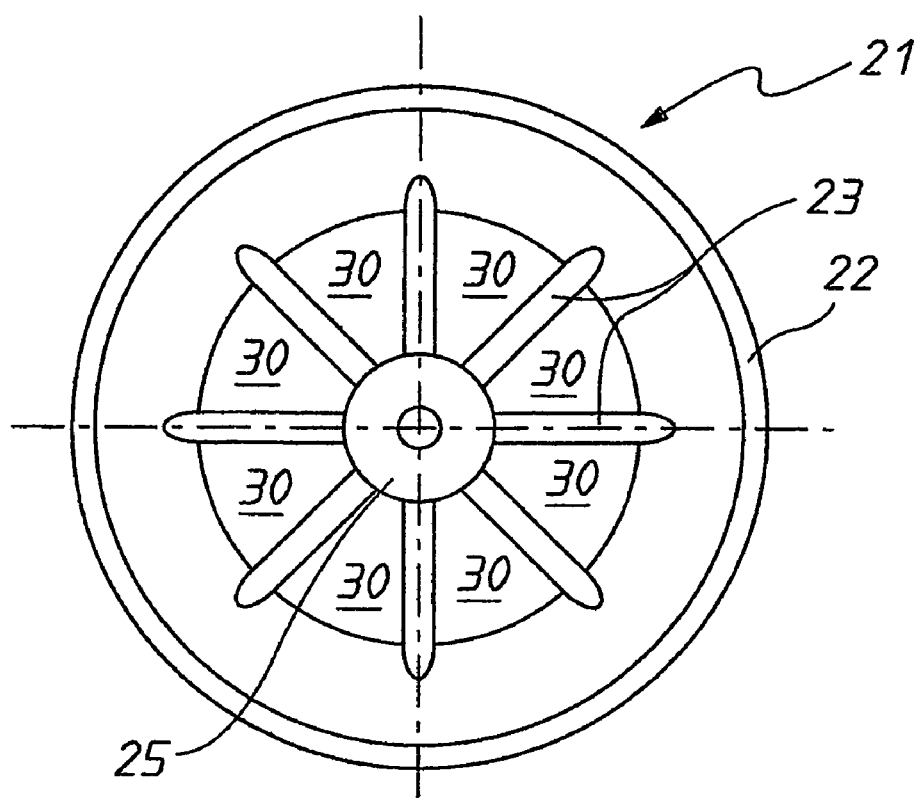
FIG. 4 is a schematic top plan view of a valve seat employed in the floor waste of FIG. 1.
Figure 5:
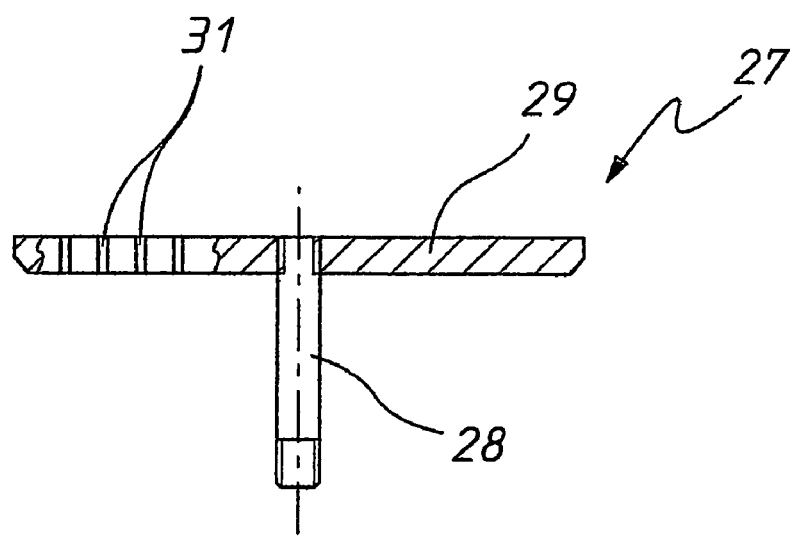
FIG. 5 is a schematic sectioned side elevation of a modification of the valve member of FIG. 3.

With reference to FIG. 4, in this embodiment the disk 29 is formed with a plurality of passages so that liquid can pass therethrough while preventing the passage of solids above a predetermined size. For example the disk 29 could be provided with a plurality of passages 31, the passages 31 being circular in configuration with a diameter of approximately 1 millimetre. Accordingly in respect of this embodiment when the disk 29 is engaged with the seat 22 liquid can pass through the passages 31 to thereby pass through the valve passage/s 30. Solids too large to pass through the passages 31 are retained.

The invention claimed is:

1. A filter assembly including:
    a hollow body through which a fluid is to pass, the body having an inlet and an outlet downstream from the inlet;
    a filter member removably located within the body to filter fluid passing from the inlet to the outlet;
    a valve seat downstream of the filter member and providing a passage through which the fluid is to pass;
    a movable obstruction member movable relative to the seat between a first position engaging the seat to at least inhibit flow of the fluid through the seat passage to thereby retain solids, and a second position spaced upstream of said seat to provide for the flow of fluid and solids through the seat passage; and wherein said filter member and said obstruction member are magnetically attracted so that when said filter member is located within said body said obstruction member is attracted to said filter member so that said obstruction member moves to said second position, while when said filter member is not located in said body said obstruction member moves to the first position thereof.

2. The filter assembly of claim 1 wherein said filter member includes a magnet that magnetically attracts said obstruction member.

3. The filter assembly of claim 2 wherein said filter member is a basket including a side wall and bottom wall, with said magnet being attached to said bottom wall.

4. The filter assembly of claim 3 wherein said fluid cannot pass through said bottom wall.

5. The filter assembly of claim 1, wherein fluid cannot pass through said obstruction member.

6. The filter assembly of claim 1 wherein said obstruction member includes at least one passage through which fluid may pass so that when said obstruction member is in said first position fluid can pass through said obstruction member so as to pass through the valve seat passage while retaining solids that cannot pass through said at least one passage.

7. The filter assembly of claim 1 wherein said obstruction member is a valve member that engages said seat.

8. The filter assembly of claim 1 wherein said seat includes a support for said obstruction member, the support slidably supporting said obstruction member for movement between the first and second positions thereof.

* * * * *